United States Patent [19]

Ochi et al.

[11] Patent Number: 4,900,385
[45] Date of Patent: Feb. 13, 1990

[54] METHOD FOR FORMING CONTAINER

[75] Inventors: Katsutoshi Ochi, Gunma; Tokitaro Suzuki, Tochigi; Hisao Ogawa, Ibaraki; Hideo Shibata; Masaru Takada, both of Nara, all of Japan

[73] Assignee: Sekisui Kaseihin Kogyo Kabushiki Kaisha, Nara, Japan

[21] Appl. No.: 355,117

[22] Filed: May 18, 1989

Related U.S. Application Data

[63] Continuation of Ser. No. 50,663, May 18, 1987, abandoned.

[30] Foreign Application Priority Data

Mar. 26, 1987 [JP] Japan .................................. 62-73907

[51] Int. Cl.⁴ .............................................. B32B 31/16
[52] U.S. Cl. .................................... 156/245; 156/285;
   156/292; 156/344; 264/549; 264/550; 206/204;
   206/524.3
[58] Field of Search ............... 156/245, 247, 285, 290,
   156/292, 306.3, 308.4, 344; 264/531, 532, 549,
      550, 551; 206/204, 484, 484.1, 485, 524.21,
         524.3, 524.6; 220/1 C, 420, 425, 431, 453, 466,
             468, 469, DIG. 12; 215/12 R, 13 R

[56] References Cited

U.S. PATENT DOCUMENTS

| | | | |
|---|---|---|---|
| 3,549,446 | 12/1970 | Bennett et al. | 156/247 |
| 3,752,065 | 8/1973 | Reiter | 206/524.3 |
| 3,935,358 | 1/1976 | Wyeth et al. | 156/245 |
| 4,443,507 | 4/1984 | Yamada et al. | 264/550 |

FOREIGN PATENT DOCUMENTS

3406399  8/1985  Fed. Rep. of Germany ...... 206/204

*Primary Examiner*—Caleb Weston
*Attorney, Agent, or Firm*—Armstrong, Nikaido, Marmelstein, Kubovcik & Murray

[57] ABSTRACT

Disclosed herein is an improved method for forming a double wall container by laminating a thermoplastic resin sheet for a container main body and a breathable thermoplastic resin sheet or film for an inner body with a low-melting adhesive, heating the laminate sheet at a forming temperature, and forming the heated laminate sheet by using a male and female molds arranged with a certain space, characterized in that the container main body and the breathable inner body are separated with a prescribed distance from each other by vacuum suction through the female mold or by air pressure through the male mold. On account of the double wall structure, the container prevents the content from becoming sticky and deteriorated and keeps the content fresh.

3 Claims, 3 Drawing Sheets

METHOD FOR FORMING CONTAINER

This application is a continuation of application Ser. No. 050,663 filed May 18, 1987, now abandoned.

FIELD OF THE INVENTION

The present invention relates to a method for forming a double wall container having a breathable sheet as an inner body and, more particularly, to a method for forming a food container which permits water or an oil to drain well or a fruit tray which keeps freshness for a long time on account of its good breathability and water absorption. The method of the invention is suitably applied to the formation of a container for transportation or storage of comparatively soft fruits such as melon and peach.

BACKGROUND OF THE INVENTION

A conventional double wall container is shown in FIGS. 5 and 6 in which FIG. 5 shows a planar view of the container and FIG. 6 shows a cross-sectional view of FIG. 5. That is, the conventional double wall container is constructed from a container main body (1) made of a thermoplastic resin sheet having bonded thereto an inner body (2) made of a thermoplastic resin sheet. This container is produced by, for example, bonding a separately formed container main body (1) and inner body (2), each being made of a thermoplastic sheet to each other to thereby form a space at the bottom, as disclosed in Japanese Patent Publication No. 20181/1980, or by bonding a breathable water absorbing sheet such as a non-woven fabric to a regularly projected and concaved bottom of a container made of a thermoplastic resin sheet to thereby form a space at the bottom, as disclosed in Japanese Utility Model Publication No. 34567/1981. However these conventional methods have disadvantages that productivity is low and production cost is high.

SUMMARY OF THE INVENTION

In order to solve the problem involved in the conventional methods for forming double wall containers, the present inventors have carried out a series of researches and led to the present invention.

Accordingly, it is an object of the present invention to provide a method for efficiently forming a double wall container having an inner body made of a breathable sheet. The method of the invention will permit the mass production and economical supply of double wall containers having an inner body made of a breathable sheet.

It is another object of the present invention to provide a method for placing a breathable sheet at an accurate position.

It is a further object of the present invention to provide a method forming a double wall container having an inner body made of a breathable sheet in a simple manner by using an existing thermoforming machine.

It is a still other object of the invention to provide, by the forming method disclosed herein, a versatile double wall container having an inner body made of a breathable sheet.

The gist of the invention resides in a method for forming a double wall container by laminating a thermoplastic resin sheet for the container main body and a breathable thermoplastic resin sheet or film for the inner body with a low-melting adhesive, heating the laminate sheet at a forming temperature, and forming the heated laminate sheet by using a male and female molds arranged with a certain space, an improvement being characterized in that the container main body and the breathable inner body are separated with a prescribed distance from each other by vacuum suction through the female mold while the edge of the heated laminated sheet are held together or by air pressure through the male mold.

DETAILED DESCRIPTION OF THE INVENTION

Figure 1:
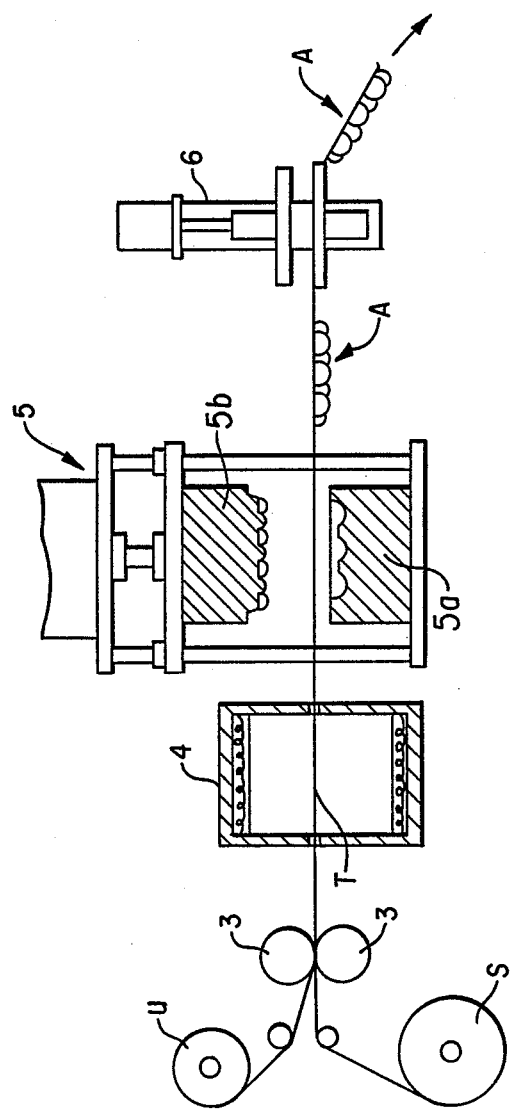
FIG. 1 is a front view of the forming line according to the method of the present invention.

According to the method of the invention, the container is formed from a laminate sheet which is prepared by bonding a thermoplastic resin sheet for the container main body and breathable thermoplastic resin sheet or film for the inner body to each other with a low-melting adhesive.

Examples of thermoplastic resin sheets which can be used include a polystyrene sheet, a polyethylene sheet, a polypropylene sheet, a poly(vinyl chloride) sheet, and the like. Foamed sheets of these thermoplastic resins may also be suitably used.

Examples of breathable thermoplastic resin sheets or films which can be used include a porous polyethylene film, a porous polypropylene film, and the like, each having a myriad of pinholes of about from 10 to 100 $\mu$m in diameter; a porous polystyrene foamed sheet, a porous polyethylene foamed sheet, and the like, each having a myriad of pinholes of about from 0.1 to 0.5 mm in diameter; and a water-absorbing, breathable non-woven fabric having a basis weight of from 15 to 50 g/m$^2$.

The non-woven fabric can be produced by integrally bonding short fibers of viscose rayon, polyethylene, polypropylene, polyamide, polyester, cellulose, or a mixture thereof with an emulsion-type adhesive such as an ethylene-vinyl acetate copolymer or a binder such as a thermoplastic resin powder. For the non-woven fabric to have good thermoformability, the short fibers should be longer than 5 mm and, preferably, be crimped. The non-woven fabric made of viscose rayon fibers or cellulose fibers is superior in water absorption properties. Usually, those having a basis weight of from 20 to 40 g/m$^2$ are used. The heavy non-woven fabric is superior in water absorption properties and cushioning properties.

A raw material for the container main body and a raw material for the inner body should be properly selected according to the intended use of the container.

The two raw materials are bonded and laminated with a low-melting adhesive. This adhesive should have a melting point of from 40° to 80° C. so that it melts and loses its adhesion when the thermoplastic resin sheet or film undergoes thermoforming. Examples of such adhesives include hot-melt adhesives, solution-type adhesives, and emulsion-type adhesives. A preferred adhesive is a film-like hot-melt adhesive such as an ethylene-vinyl acetate copolymer or low-density polyethylene.

The bonding of the two raw materials may be applied to the overall or part of surfaces thereof.

The invention is now described with reference to the following specific example along with FIGS. 1 to 4.

At first, a laminate sheet to be formed into the container is produced by bonding a foamed polystyrene sheet (thickness: 2 mm, expansion ratio: 12) and a non-woven fabric (basis weight: 30 g/m$^2$) composed of a mixture of a viscose rayon fiber (70%) and a polypropylene fiber (30%). The two webs are passed through a pair of heated rolls (3) for bonding. The bonding is accomplished by a film-like hot-melt adhesive (thickness: 15 μm) of an ethylene-vinyl acetate copolymer having a melting point of 65° C. The hot-melt adhesive indicated by M is previously laminated to the non-woven fabric.

Figure 2:
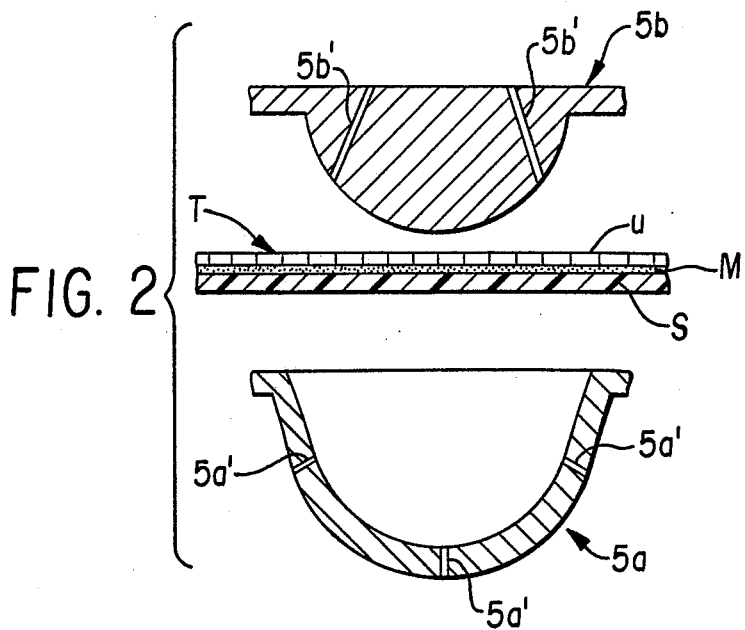
FIGS. 2 to 4 each is a cross-sectional view showing the important parts in the forming process in the present invention.

The resulting laminate sheet indicated by T is subsequently passed through a heating furnace (4) for softening. The softened laminate sheet is entered into a space between a female mold (5a) and a male mold (5b) of a forming apparatus (5). The male mold (5b) has projections, and the female mold (5a) has concaves, as shown in FIG. 2. Each projection on the male mold (5b) and each concave on the female mold (5a) have such a shape as to form a prescribed space indicated by C in FIG. 3 when the molds are closed. In addition, each projection and concave have vent holes (5a') and (5b'), respectively.

Figure 3:
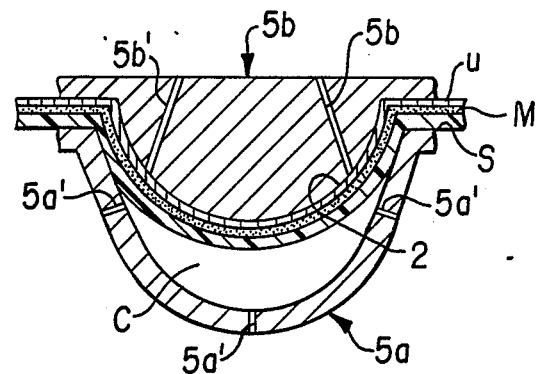
Figure 4:
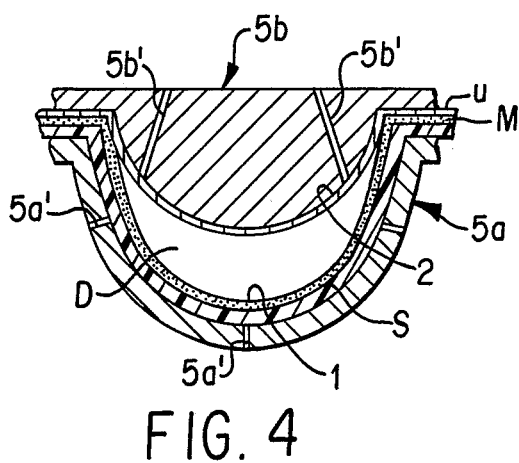
Figure 5:
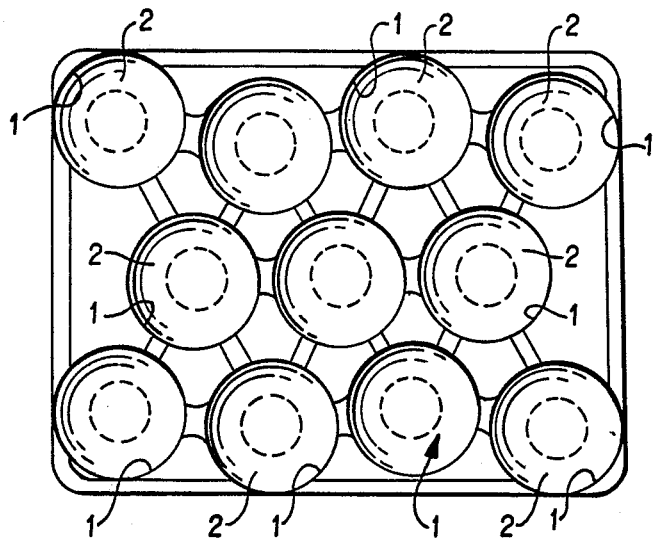
FIG. 5 is a planar view showing an example of the conventional double wall container.
Figure 6:
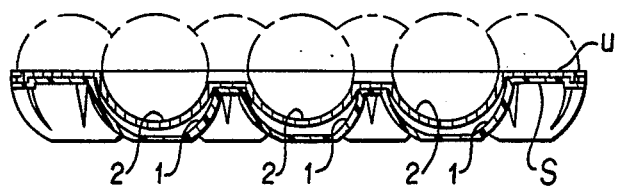
FIG. 6 is a cross-sectional view of FIG. 5.

The female mold (5a) and male mold (5b) are closed so that the laminate sheet is tightly secured by the edges of the molds and the interior portions of the laminated sheet are roundly depressed in conformity to the individual projections and concaves, as shown in FIG. 3. While the molds are still closed with the edges of the laminate being held, the interior portions of the foamed polystyrene sheet (S) together with the hot-melt adhesive (M) are separated from the breathable non-woven fabric (u) by the application of vacuum suction through the vent holes (5a') in the female mold (5a). The foamed polystyrene sheet (S) is brought into close contact with the concave of the female mold (5a). In this way, the inner body (2) and the concave part of the container main body (1) to hold the inner body (2) are formed simultaneously, as shown in FIG. 4 with the portions of the sheets and the fabric (u) still in contact with each other readhering to each other as the container cools below the melt point of the adhesive.

Further, when the above-formed portion is trimmed by means of a trimming device (6), a tray (A) to hold the inner body (2) in the concave part of the container main body (1) is produced.

According to another method, the female mold (5a) and male mold (5b) are closed so that the laminate sheet is roundly depressed in conformity to the individual projections and concaves, as shown in FIG. 3. While the molds are still closed, the foamed polystyrene sheet (S) together with the hot-melt adhesive (M) is separated from the breathable non-woven fabric (u) by releasing a compressed air having a pressure of from 2 to 4 kg/cm$^2$G through the vent holes (5b') in the male mold (5b). The foamed polystyrene sheet (S) is brought into close contact with the concave of the female mold (5a). In this way, the inner body (2) and the concave part of the container main body (1) to hold the inner body (2) are formed simultaneously.

The latter method is better than the former method in terms of separation properties, so that the hot-melt adhesive (M) is transferred to the foamed polystyrene sheet (S), and the shapes of the inner body (2) and the concave part of the container main body (1) are kept constant. Further, according to this later method, it is possible to form a deeper concave part of the container main body (1).

According to still another method, the separation and forming may be accomplished by supplying compressed air through the vent hole (5b') in the male mold (5b) and, at the same time, evacuating the space through the vent hole (5a') in the female mold (5a).

The inner body (2), which is made of a water-absorbing breathable non-woven fabric, keeps the content (B) (e.g., fruits) suspended. Therefore, it provides good cushioning properties and absorbs or lets escape the moisture liberated from the contents (B).

On account of the double wall structure as explained above, the container made by the method of the invention prevents the contents (B) from becoming sticky and deteriorated and keeps the contents fresh.

While the invention has been described in detail and with reference to specific embodiments thereof, it will be apparent to one skilled in the art that various changes and modifications can be made therein without departing from the spirit and scope thereof.

What is claimed is:

1. An improved method of forming a double wall container, comprising the steps of: laminating a thermoplastic resin sheet for a container mainbody and a water-absorbing breathable non-woven fabric sheet for an inner body with a low-melting adhesive, said non-woven fabric sheet being formed of bonded fibers having a length longer than 5 mm and a basic weight in the range of from 15 to 50 g/m$^2$, heating the laminate sheet at a forming temperature, feeding the heated laminate sheet between a male mold and a female mold arranged with a certain space therebetween in a forming zone with the container main body sheet facing the female mold and the inner body sheet facing the male mold, clamping the edges of said laminate sheet with the female mold and the male mold, and separating the container main body sheet and the breathable inner body sheet to a prescribed distance from each other by the combination of the application of vacuum suction through the female mold and the application of air pressure through the male mold, said air pressure passing through said breathable non-woven fabric sheet.

2. A method as claimed in claim 1, wherein the low-melting adhesive is one which loses its adhesion at said forming temperature.

3. A method as claimed in claim 1, wherein the thermoplastic resin sheet is a polystyrene sheet, a polyethylene sheet, a polypropylene sheet, or a polyvinyl chloride sheet.

* * * * *